(12) United States Patent
Diallo et al.

(10) Patent No.: US 6,292,380 B2
(45) Date of Patent: Sep. 18, 2001

(54) SELF-REGULATED SYNCHRONOUS RECTIFIER

(75) Inventors: Almadidi Diallo, Thorigne-Foullard; Patrick Ceunebrock, Pleumeur Bodou, both of (FR)

(73) Assignee: Alcatel (FR)

( * ) Notice: Subject to any disclaimer, the term of this patent is extended or adjusted under 35 U.S.C. 154(b) by 0 days.

(21) Appl. No.: 09/725,847

(22) Filed: Nov. 30, 2000

(30) Foreign Application Priority Data

Jan. 3, 2000 (FR) .................................................. 00 00 007

(51) Int. Cl.[7] ............................ H02M 5/42; H02M 7/217
(52) U.S. Cl. ................................................. 363/89; 363/127
(58) Field of Search ................................. 363/89, 127, 84, 363/52, 53, 37, 17; 323/282, 284, 222

(56) References Cited

U.S. PATENT DOCUMENTS

| 4,893,228 | * | 1/1990 | Orrick et al. ............................ 363/89 |
| 5,144,547 | * | 9/1992 | Masamoto ............................ 363/127 |
| 5,179,512 | * | 1/1993 | Fisher et al. ............................ 363/127 |
| 5,663,877 | * | 9/1997 | Dittili et al. ............................ 363/127 |
| 5,708,571 |   | 1/1998 | Shinada . |

FOREIGN PATENT DOCUMENTS

| 0 665 634 A1 | 8/1995 | (EP) . |
| 0 884 829 A1 | 12/1998 | (EP) . |

* cited by examiner

*Primary Examiner*—Peter S. Wong
*Assistant Examiner*—Rajnikant G. Patel
(74) *Attorney, Agent, or Firm*—Sughrue, Mion, Zinn, Macpeak & Seas, PLLC

(57) ABSTRACT

A self-regulated synchronous rectifier is connected between a secondary transformer winding and an LC filter. The rectifier includes two MOSFETs each having a gate connected in series with a gate protection circuit. Each gate protection circuit includes a divider bridge and a switch connected in parallel with the divider bridge and having an open position and a closed position and the rectifier includes a control device for controlling the switches which receives an input signal proportional to the input voltage of the rectifier and produces output signals for controlling the switches.

7 Claims, 3 Drawing Sheets

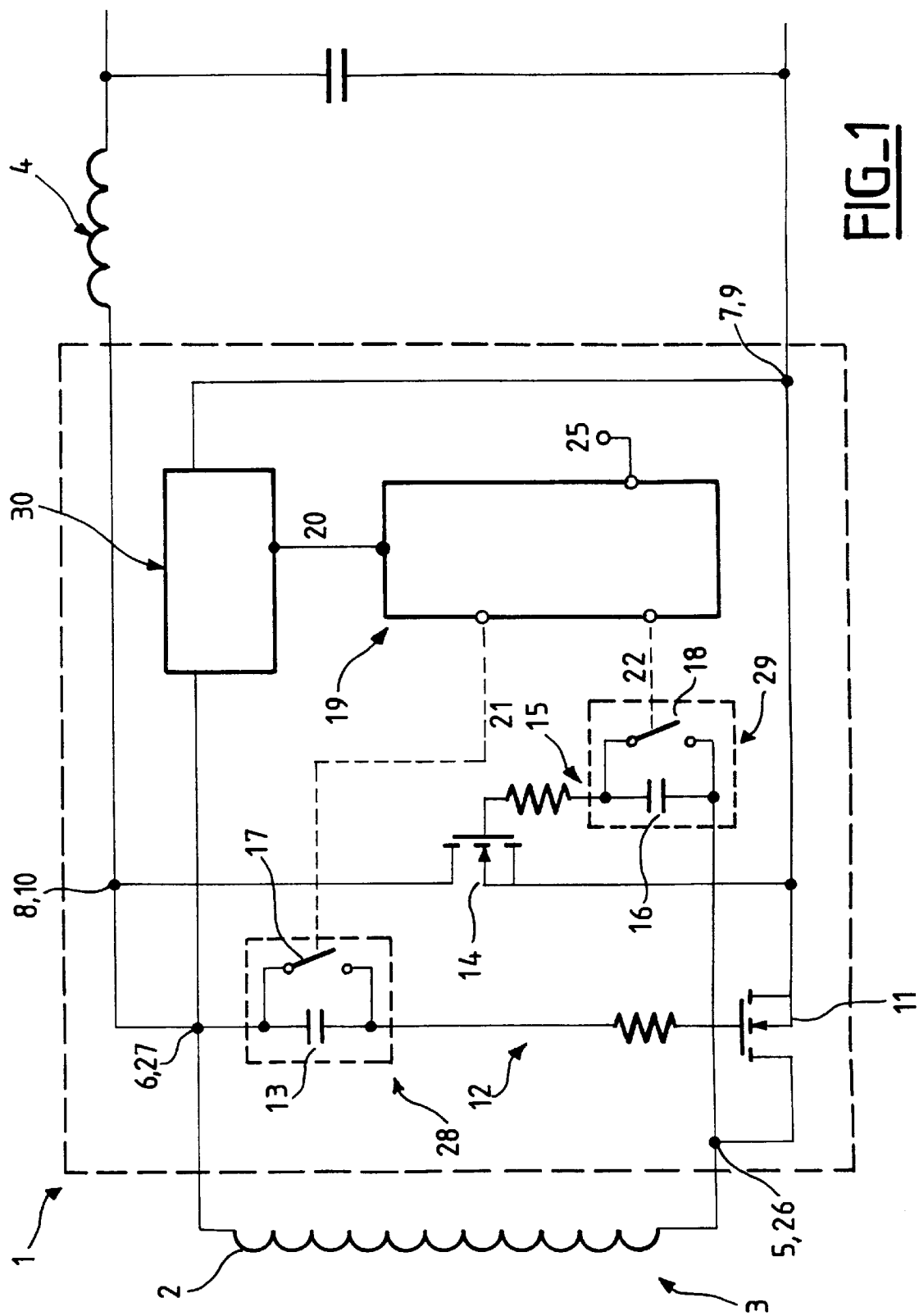
FIG_1

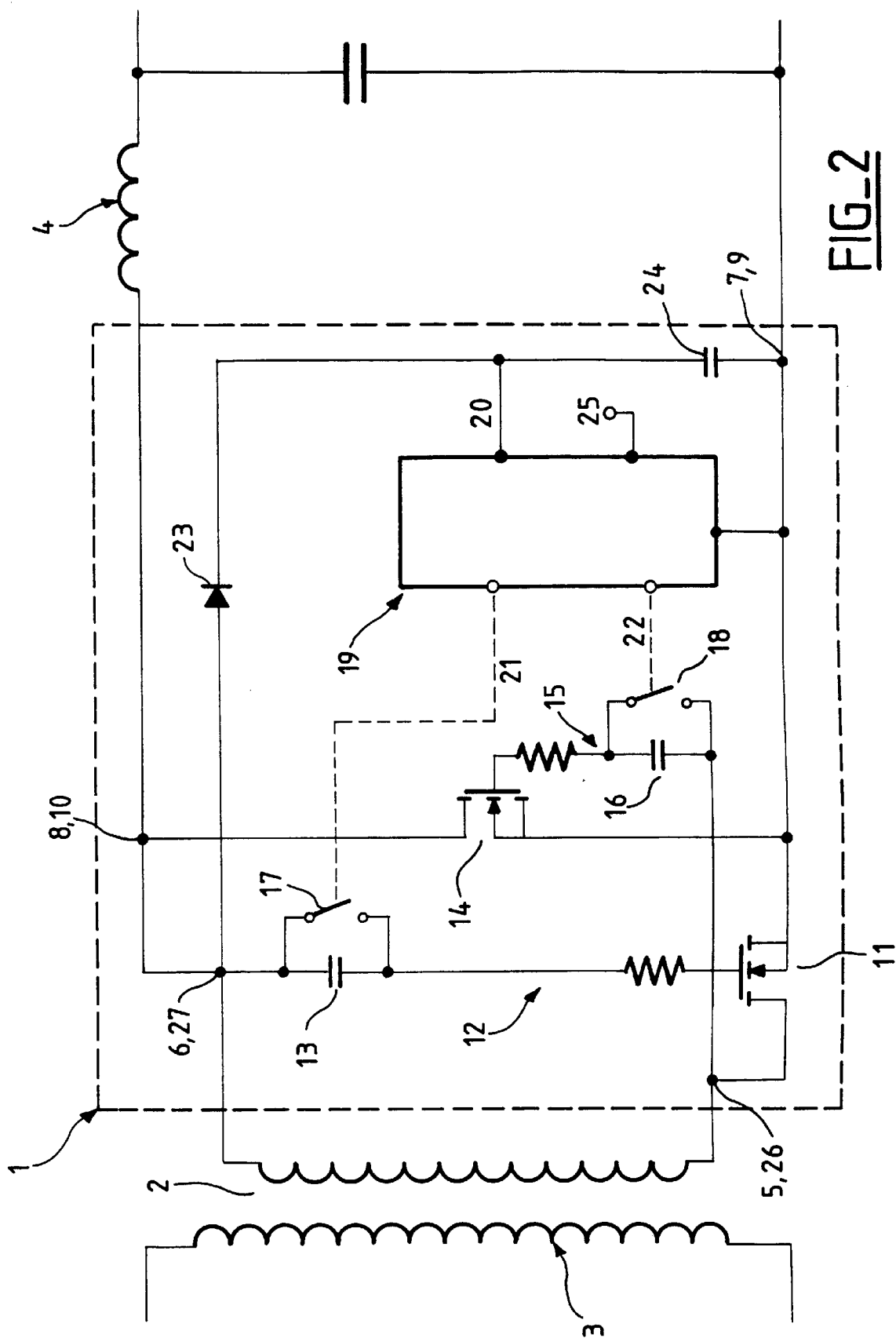
FIG_2

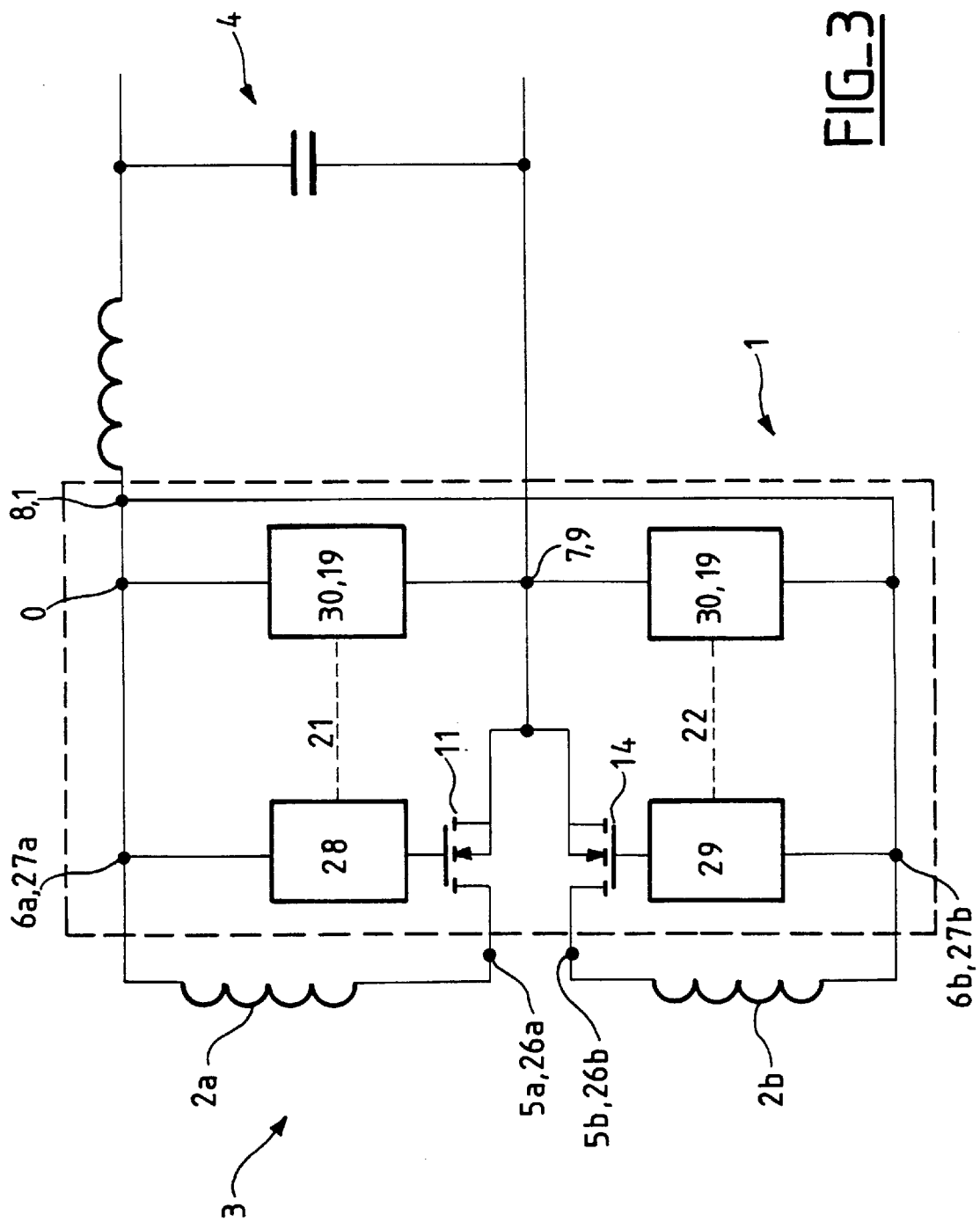
FIG_3

SELF-REGULATED SYNCHRONOUS RECTIFIER

BACKGROUND OF THE INVENTION

1. Field of the Invention

The invention relates to a self-regulated synchronous rectifier. The invention relates in particular to a self-regulated synchronous rectifier used in an AC/DC or DC/DC converter.

The invention relates to a synchronous rectifier regulated by coupled winding or self-regulated by symmetrical or asymmetrical direct energy transfer. In the remainder of the text, the expression "self-regulated synchronous rectifier" also means "synchronous rectifier regulated by coupled winding".

2. Description of the Prior Art

Asymmetrical conversion systems including an initial voltage source discharging into a transformer primary connected in parallel with a main switch are known in the art. The secondary of the transformer is connected in cascade with a self-regulated synchronous rectifier and a filter. The output of the filter discharges a regulated DC voltage into an application. In a conversion system of the above type the role of the self-regulated synchronous rectifier is:

- to deliver to the application, via the filter, the energy transferred by the transformer in the on period of the main switch, and
- to block the transfer during the off period of the main switch, the application being powered by the coil of the filter during the off period of the main switch.

An asymmetrical self-regulated synchronous rectifier includes two MOSFETs adapted to perform the above two functions. For example, the asymmetrical self-regulated synchronous rectifier includes:

- a first and a second output of the rectifier,
- a first MOSFET connected between the first secondary transformer end and the first output of the rectifier and having its gate connected to the second end of the secondary of the transformer, and
- a second MOSFET connected between the first output of the rectifier and the second output of the rectifier and having its gate connected to the first transformer end.

The secondary voltage of the transformer controls the two MOSFETs.

For economic reasons, manufacturers wish to develop converters accommodating a wide range of input voltage in one and the same product. This implies that the secondary voltage of the transformer also varies within a wide range. However, the secondary voltage of the transformer is also the signal at the gate of the MOSFETs of the rectifier. There are limits on the voltages that can be applied to the gates of MOSFETs. If too high a voltage is applied to the gate of a MOSFET, the MOSFET may be destroyed. Protecting MOSFETs from an overvoltage at the gate by connecting the gate in series with a passive voltage divider bridge is known in the art. However, the voltage divider causes high losses if the transformer secondary voltage is too low or too high. The voltage applied to the gate of the MOSFETs is too low or too high for optimum control of the MOSFETs, i.e. with an optimum control dynamic range which is most economical in terms of losses. As a result, for low output voltages, the feasible power transferred is very low and for higher output voltages the dynamic range of the input voltage is small.

One object of the present invention is to propose a self-regulated synchronous rectifier in which the gate is protected against gate overvoltages, allowing wide variation of the input voltage combined with optimum performance in terms of output current and voltage.

SUMMARY OF THE INVENTION

The invention provides a self-regulated synchronous rectifier connected between a secondary transformer winding and an LC filter.

The self-regulated synchronous rectifier includes two MOSFETs each having a gate connected in series with a gate protection circuit.

According to the invention, each gate protection circuit includes a divider bridge and a switch connected in parallel with the divider bridge and having an open position and a closed position and the rectifier includes a control device for controlling the switches adapted to receive an input signal proportional to the input voltage of the rectifier and producing output signals for controlling the switches.

In an asymmetrical first embodiment the rectifier is connected between the secondary transformer winding, which has first and second transformer ends, and the LC filter, which has first and second filter inputs, and has:

- first and second rectifier inputs respectively connected to the first and second transformer ends,
- first and second rectifier outputs, the second rectifier output being connected to the second rectifier input,
- a direct MOSFET connected between the first rectifier input and the first rectifier output and having a gate connected to the second rectifier input and in series with the gate protection circuit, and
- a freewheel MOSFET connected between the first rectifier output and the second rectifier output and having a gate connected to the first rectifier input and in series with the gate protection circuit.

In a symmetrical second embodiment the secondary winding of the transformer includes first and second sub-windings of opposite phase, each of the sub-windings having first and second transformer ends, and an LC filter having first and second filter inputs.

The self-regulated synchronous rectifier includes:

- first and second rectifier inputs respectively connected to the transformer ends of the first sub-winding defining a first subsystem,
- first and second rectifier inputs respectively connected to the transformer ends of the second sub-winding defining a second subsystem, and
- first and second rectifier outputs, the second rectifier output being connected to the second rectifier input of the first subsystem.

One MOSFET is connected between the first rectifier input of the first subsystem and the first rectifier output and has a gate connected to the second rectifier input of the first subsystem and in series with the gate protection circuit.

The other MOSFET is connected between the first rectifier input of the second subsystem and the first rectifier output and has a gate connected to the second rectifier input of the second subsystem and in series with the gate protection circuit.

In one embodiment the control device generates two output signals independent of each other and each signal controls one of the switches.

In another embodiment the control device generates two interdependent output signals and each signal controls one of the switches.

The control device includes means for generating at least one threshold value and means for comparing the input signal proportional to the rectifier input voltage with the threshold value and the output signals are a function of the direction of the comparison between the input signal proportional to the rectifier input voltage and the threshold value.

The rectifier can include voltage measuring means including a diode connected in series with a measurement capacitor between the second rectifier input and the first rectifier output and the input signal is taken off between the diode and the measurement capacitor.

One advantage of the present invention results from the dynamic control of the gate voltage, enabling the voltage divider bridge to be short circuited or not, according to the transformer secondary voltage. Thus, whatever the amplitude of the input voltage of the self-regulated synchronous rectifier, the gate voltages of the MOSFETs are optimized to limit losses and retain an optimum switching dynamic range. Accordingly, for wide variations in the input voltage it is possible, at the same voltage, and with the same overall volume, to feed more power into a converter including a rectifier in accordance with the invention.

Other advantages and features of the present invention will emerge from the following description, which is given with reference to the accompanying drawings.

BRIEF DESCRIPTION OF THE DRAWINGS

FIG. 1 is a block diagram of an asymmetrical self-regulated synchronous rectifier according to the invention.

FIG. 2 is a block diagram of one embodiment of an asymmetrical self-regulated synchronous rectifier according to the invention.

FIG. 3 is a block diagram of a symmetrical self-regulated synchronous rectifier according to the invention.

DETAILED DESCRIPTION OF THE PREFERRED EMBODIMENTS

The invention relates to a symmetrical or asymmetrical self-regulated synchronous rectifier 1.

The asymmetrical self-regulated synchronous rectifier 1 shown in FIGS. 1 and 2 is connected between the secondary 2 of a transformer 3 and an LC filter 4.

More particularly, the asymmetrical self-regulated synchronous rectifier 1 has first and second rectifier inputs 26, 27 connected to first and second transformer ends 5, 6 of the secondary winding 2 of the transformer 3 and first and second rectifier outputs 9, 10 connected to first and second filter inputs 7, 8 of the LC filter 4. The second output of the rectifier 10 is connected to the second input of the rectifier 27.

The asymmetrical self-regulated synchronous rectifier conventionally includes:
  a direct MOSFET 11 connected between the first rectifier input 26 and the first rectifier output 9; the gate 12 of the MOSFET 11 is connected to the second rectifier input 27; the gate 12 is connected in series with a gate protection circuit 28, and
  a freewheel MOSFET 14 connected between the first rectifier output 9 and the second rectifier output 10; the gate 1 5 of the freewheel MOSFET 14 is connected to the first rectifier input 26; the gate 15 is connected in series with a gate protection circuit 29.

In accordance with the invention, each gate protection circuit 28, 29 includes a divider 13, 16 connected in parallel with a switch 17, 18 having an open position and a closed position.

In conjunction with the inherent capacitance or the impedance between the gate and the source of the MOSFET, the divider 13, 16 constitutes a non-dissipative divider bridge. For convenience, in the remainder of the text the reference numbers 13 and 14 refer to the divider bridges.

The rectifier 1 further includes a device 19 for controlling the switches 17, 18. The control device 19 receives an input signal 20 proportional to the input voltage of the rectifier 1 and its output signals 21, 22 control the switches 17, 18.

The input signal 20 proportional to the voltage at the input of the rectifier 1 is generated by voltage measuring means 30.

The control device 19 further includes means for generating at least one threshold value and means for comparing the input signal 20 with the threshold value. The output signals 21, 22 depend on the direction of the comparison between the input signal 20 and the threshold value.

The asymmetrical rectifier in accordance with the invention operates as follows:

Depending on the topology, the input voltage of the rectifier 1 takes various forms which, in the direct phase, for convenience, can be treated as a squarewave signal VR whose duty factor or frequency can be modulated and whose amplitude varies as a function of the voltage range chosen for the converter. The input voltage of the rectifier 1 is in fact the voltage across the secondary 2 of the transformer 3 and, in addition to supplying power to the application, is also used as a control signal for the MOSFETs 11, 14.

In the positive half of the squarewave signal the direct MOSFET 11 is turned on and the freewheel MOSFET 14 is turned off. The input signal 20 proportional to the voltage at the input of the rectifier 1 is generated by voltage measuring means 30.

The control device 19 compares the input signal 20 with the threshold value 25. The threshold value 25 is a reference voltage. For example, the reference voltage can be a voltage proportional to the regulated voltage at the output of the conversion system (filter output). That value is chosen as a function of the voltage level below which the gate voltage resulting from the reduction 13 of the input voltage of the rectifier 1 by the divider bridge is too low, causing high losses and MOSFET switching dynamic stress problems.

For input voltages of the rectifier 1 higher than the threshold value, the control device 19 opens the switch 17 and the gate voltage is limited by the divider bridge 13.

For input voltages of the rectifier 1 below the threshold value the control device 19 closes the switch 17 and the input voltage of the rectifier 1 then passes directly to the gate of the direct MOSFET 11.

During the positive half of the squarewave signal VR the gate of the freewheel MOSFET 14 is at a negative voltage equal to the voltage drop at the terminals of the direct MOSFET 11. The gate of the freewheel MOSFET 14 is therefore protected against reverse voltages and the switch 18 can remain open, regardless of the amplitude of the input voltage of the rectifier, while the direct MOSFET 11 is turned on. To ensure that the absolute value of the gate voltage remains below the threshold at which the MOSFET may be destroyed, the switch 18 remains open, regardless of the amplitude of the input voltage of the rectifier.

During the negative half of the squarewave signal the freewheel MOSFET 14 is turned on and the direct MOSFET 11 is turned off. The gate of the freewheel MOSFET 14 is therefore at a positive voltage. The operation described for the positive half of the signal is then interchanged between the direct MOSFET 11 and the freewheel MOSFET 14.

There can be several different threshold values 25, for example one value dedicated to the direct MOSFET 11 and one value dedicated to the freewheel MOSFET 14, with a view to optimizing the losses of each MOSFET of the rectifier according to the input voltage.

The control signals 21, 22 can be generated in an interdependent manner or by two independent control circuits.

In the embodiment shown in FIG. 2 the voltage measuring means 30 include a diode 23 connected in series with a measuring capacitor 24 and between the second rectifier input 27 and the first rectifier output 9. The input signal 20 is taken off between said diode 23 and the measurement capacitor 24.

The diode 23 conducts during the positive half of the signal and powers the measurement capacitor 24 generating the input signal 20 proportional to the input voltage of the rectifier. During the negative half of the signal the value 20 measured during the positive half of the signal controls the switch 18 of the freewheel MOSFET 14.

FIG. 3 is a block diagram of a symmetrical self-regulated synchronous rectifier according to the invention. In this embodiment the two MOSFETs 11, 14 transfer energy directly. The principle of operation of the rectifier is that of symmetrical direct energy transfer systems known to the skilled person. The detection and gate protection principles described for the asymmetrical system can be applied in full.

In this symmetrical embodiment the secondary winding 2 of the transformer 3 includes first and second sub-windings 2a, 2b with opposite phases, each sub-winding having first and second transformer ends 5a, 6a; 5b, 6b, and an LC filter 4 having first and second filter inputs 7, 8.

The symmetrical self-regulated synchronous rectifier includes:

first and second rectifier inputs 26a, 27a respectively connected to the transformer ends 5a, 6a of the first sub-winding 2a defining a first subsystem, first and second rectifier inputs 26b, 27b respectively connected to the transformer ends 5b, 6b of the second sub-winding 2b defining a second subsystem, first and second rectifier outputs 9, 10, the second rectifier output 10 being connected to the second rectifier input 27a of the first subsystem, one MOSFET 11 connected between the first rectifier input 26a of the first subsystem and the first rectifier output 9 and having its gate 12 connected to the second rectifier input 27a of the first subsystem and in series with the gate protection circuit 28, and the other MOSFET 14 connected between the first rectifier input 26b of the second subsystem and the first rectifier output 9 and having its gate 15 connected to the second rectifier input 27b of the second subsystem and in series with the gate protection circuit 29.

Of course, the invention is not limited to the embodiments described and shown and lends itself to many variants that will be evident to the skilled person and do not depart from the scope of the invention.

In particular, the invention includes all means known in the art for measuring the input voltage of the rectifier or an equivalent, all means known in the art for comparing the measured value to a reference value and all means known in the art for short circuiting the divider bridge or bridges of the rectifier in accordance with predetermined rules as a function of the direction of the comparison.

There is claimed:

1. A self-regulated synchronous rectifier connected between a secondary transformer winding and an LC filter and including two MOSFETs each having a gate connected in series with a gate protection circuit, wherein each gate protection circuit includes a divider bridge and a switch connected in parallel with said divider bridge and having an open position and a closed position, said rectifier including a control device for controlling said switches adapted to receive an input signal proportional to the input voltage of said rectifier and producing output signals for controlling said switches.

2. The self-regulated synchronous rectifier claimed in claim 1 when connected between the secondary transformer winding, which has first and second transformer ends, and said LC filter, which has first and second filter inputs, wherein said self-regulated synchronous rectifier has:

first and second rectifier inputs respectively connected to said first and second transformer ends, first and second rectifier outputs, said second rectifier output being connected to said second rectifier input, said direct MOSFET connected between said first rectifier input and said first rectifier output and having a gate connected to said second rectifier input and in series with said gate protection circuit, and said freewheel MOSFET connected between said first rectifier output and said second rectifier output and having a gate connected to said first rectifier input and in series with said gate protection circuit.

3. The self-regulated synchronous rectifier claimed in claim 1 wherein said secondary winding of said transformer includes first and second sub-windings of opposite phase, each of said sub-windings having first and second transformer ends, and an LC filter having first and second filter inputs, wherein said self-regulated synchronous rectifier includes:

first and second rectifier inputs respectively connected to said transformer ends of said first sub-winding defining a first subsystem, first and second rectifier inputs respectively connected to said transformer ends of said second sub-winding defining a second subsystem, first and second rectifier outputs, said second rectifier output being connected to said second rectifier input of said first subsystem, one MOSFET connected between said first rectifier input of said first subsystem and said first rectifier output and having a gate connected to said second rectifier input of said first subsystem and in series with said gate protection circuit, and the other MOSFET connected between said first rectifier input of said second subsystem and said first rectifier output and having a gate connected to said second rectifier input of said second subsystem and in series with said gate protection circuit.

4. The self-regulated synchronous rectifier claimed in claim 1 wherein said control device generates two output signals independent of each other and each signal controls one of said switches.

5. The self-regulated synchronous rectifier claimed in claim 1 wherein said control device generates two interdependent output signals and each signal controls one of said switches.

6. The self-regulated synchronous rectifier claimed in claim 1 wherein said control device includes means for generating at least one threshold value and means for comparing said input signal proportional to said rectifier input voltage with said threshold value and said output signals are a function of the direction of the comparison between said input signal proportional to said rectifier input voltage and said threshold value.

7. The self-regulated synchronous rectifier claimed in claim 1 including voltage measuring means including a diode connected in series with a measurement capacitor between said second rectifier input and said first rectifier output and wherein said input signal is taken off between said diode and said measurement capacitor.

* * * * *